United States Patent
Jayaraman (10) Patent No.: US 8,200,641 B2
(45) Date of Patent: Jun. 12, 2012

(54) DICTIONARY FOR DATA DEDUPLICATION

(75) Inventor: Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 12/858,230

(22) Filed: Aug. 17, 2010

(65) Prior Publication Data

US 2011/0066628 A1 Mar. 17, 2011

Related U.S. Application Data

(60) Provisional application No. 61/241,828, filed on Sep. 11, 2009.

(51) Int. Cl.
*G06F 17/00* (2006.01)
(52) U.S. Cl. ........ 707/692; 707/687; 707/790; 715/234; 341/51
(58) Field of Classification Search .................. None
See application file for complete search history.

(56) References Cited

U.S. PATENT DOCUMENTS

| | | | | |
|---|---|---|---|---|
| 5,990,810 A | * | 11/1999 | Williams | 341/51 |
| 6,667,700 B1 | * | 12/2003 | McCanne et al. | 341/51 |
| 8,078,593 B1 | * | 12/2011 | Ramarao | 707/692 |
| 2009/0089483 A1 | * | 4/2009 | Tanaka et al. | 711/103 |
| 2011/0087640 A1 | * | 4/2011 | Dodd et al. | 707/693 |

* cited by examiner

*Primary Examiner* — Hung Le
(74) *Attorney, Agent, or Firm* — Kwan Intellectual Property Law (57) ABSTRACT

Mechanisms are provided for efficiently improving a dictionary used for data deduplication. Dictionaries are used to hold hash key and location pairs for deduplicated data. Strong hash keys prevent collisions but weak hash keys are more computation and storage efficient. Mechanisms are provided to use both a weak hash key and a strong hash key. Weak hash keys and corresponding location pairs are stored in an improved dictionary while strong hash keys are maintained with the deduplicated data itself. The need for having uniqueness from a strong hash function is balanced with the deduplication dictionary space savings from a weak hash function.

20 Claims, 7 Drawing Sheets

| Data A | Data B | Data C | File X 101 |
|---|---|---|---|
| Data D | Data B | Data C | File Y 103 |
| Data D | Data B | Data E | File Z 105 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data A | 1 |
| 2 | Offset-Data B | 1 |
| 3 | Offset-Data C | 1 |
| | Datastore | |
| | Data 261 | Last File 263 |
| 1 | Data A | File X 201 |
| 2 | Data B | File X 201 |
| 3 | Data C | File X 201 |

Figure 3A

| Filemap File X 301 | | |
|---|---|---|
| Offset 303 | Index 305 | Lname 307 |
| 0K | 0.1 | NULL |
| 8K | 0.2 | NULL |
| 16K | 0.3 | NULL |

| Filemap File Y 311 | | |
|---|---|---|
| Offset 313 | Index 315 | Lname 317 |
| 0K | 0.4 | NULL |
| 8K | 0.2 | File X 301 |
| 16K | 0.3 | File X 301 |

Figure 3B

| Datastore Suitcase 371 | | |
|---|---|---|
| | Data Table 351 | |
| Index 353 | Data Offset 355 | Data Reference Count 357 |
| 1 | Offset-Data A | 1 |
| 2 | Offset-Data B | 2 |
| 3 | Offset-Data C | 2 |
| 4 | Offset-Data D | 1 |
| | Datastore | |
| | Data 361 | Last File 363 |
| 1 | Data A | File X 301 |
| 2 | Data B | File Y 311 |
| 3 | Data C | File Y 311 |
| 4 | Data D | File Y 311 |

Figure 4A

| Filemap File X 401 | | |
|---|---|---|
| Offset 403 | Index 405 | Lname 407 |
| 0K | 0.1 | NULL |
| 8K | 0.2 | NULL |
| 16K | 0.3 | NULL |

| Filemap File Y 411 | | |
|---|---|---|
| Offset 413 | Index 415 | Lname 417 |
| 0K | 0.4 | NULL |
| 8K | 0.2 | File X 401 |
| 16K | 0.3 | File X 401 |

| Filemap File Z 421 | | |
|---|---|---|
| Offset 423 | Index 425 | Lname 427 |
| 0K | 0.4 | NULL |
| 8K | 0.2 | File X 401 |
| 16K | 0.3 | File X 401 |

Figure 4B

| Datastore Suitcase 471 | | |
|---|---|---|
| Data Table 451 | | |
| Index 453 | Data Offset 455 | Data Reference Count 457 |
| 1 | Offset-Data A | 1 |
| 2 | Offset-Data B | 3 |
| 3 | Offset-Data C | 2 |
| 4 | Offset-Data D | 2 |
| 5 | Offset-Data E | 1 |
| Datastore | | |
| | Data 461 | Last File 463 |
| 1 | Data A | File X 401 |
| 2 | Data B | File Z 421 |
| 3 | Data C | File Y 411 |
| 4 | Data D | File Z 421 |
| 5 | Data D | File Z 421 |

DICTIONARY FOR DATA DEDUPLICATION

CROSS-REFERENCE TO RELATED APPLICATION

The present application claims benefit under 35 U.S.C. 119(e) to U.S. Provisional Application No. 61/241,828 filed Sep. 11, 2009, and titled "IMPROVED DICTIONARY FOR DATA DEDUPLICATION," all of which is incorporated herein by this reference for all purposes.

TECHNICAL FIELD

The present disclosure relates to improving a dictionary for data deduplication.

DESCRIPTION OF RELATED ART

Maintaining vast amounts of data is resource intensive not just in terms of the physical hardware costs but also in terms of system administration and infrastructure costs. Some mechanisms allow compression of data to save on resources. For example, some file formats such as the Portable Document Format (PDF) are compressed. Some other utilities allow compression on an individual file level in a relatively inefficient manner. Still other mechanisms allow for more efficient tape backup of data.

Data deduplication refers to the ability of a system to eliminate data duplication across files to increase storage, transmission, and/or processing efficiency. A storage system which incorporates deduplication technology involves storing a single instance of a data segment that is common across multiple files and/or users. In some examples, data sent to a storage system is segmented in fixed or variable sized segments. Each segment is processed using a hash function to generate a hash key. Once the hash key is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

A dictionary is used to maintain hash key and location pairings. However, mechanisms for managing computation and storage needs of a dictionary are limited. Consequently, mechanisms are provided for improving dictionaries used for data deduplication.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of data. However, it should be noted that the techniques and mechanisms of the present invention apply to a variety of different types of data and data formats. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for efficiently improving a dictionary used for data deduplication. Dictionaries are used to hold hash key and location pairs for deduplicated data. Strong hash keys prevent collisions but weak hash keys are more computation and storage efficient. Mechanisms are provided to use both a weak hash key and a strong hash key. Weak hash keys and corresponding location pairs are stored in an improved dictionary while strong hash keys are maintained with the deduplicated data itself. The need for having uniqueness from a strong hash function is balanced with the deduplication dictionary space savings from a weak hash function.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data.

According to various embodiments, an optimization tool can aggressively compress and deduplicate files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file or portion of the individual file that is processed to increase the storage efficiency of the file is referred to herein as a compressed file. Any file associated with a group of files that are processed to increase the storage efficiency of the group of files is referred to herein as a deduplicated file. That is, instead of simply optimizing a single file, multiple files can be optimized efficiently.

Optimization may involve identifying variable or fixed sized segments. According to various embodiments, each segment of data is processed using a hash algorithm such as MD5 or SHA-1. This process generates a unique ID for each segment. If a file is updated, only the changed data may be saved. That is, if only a few bytes of a document or presentation are changed, only changed portions are saved. In some instances, deduplication searches for matching sequences using a fixed or sliding window and uses references to matching sequences instead of storing the matching sequences again.

According to various embodiments, deduplication systems include dictionaries, filemap suitcases, and datastore suitcases. A dictionary is a file that contains the segment identifiers and location pairs. The segment identifiers can be created by using an MD5, SHA or other mechanism for creating a unique ID for a data segment. Since the dictionary can grow into a large file (>1 TB) it must be organized in a way that makes it readily searchable. Organizing the identifier/location pairs in a binary tree is one approach which can be used to accelerate searches. Each optimizer node in the cluster can have its own dictionary.

In particular embodiments, filemap suitcases are regular files which hold filemaps for deduplicated files. Filemaps are used to reference all data segments for the associated file whether the segments are common to other files or unique. A datastore suitcase holds the actual data segments for the deduplicated files. Each data segment has a reference count associated with it. The reference count specifies the number of filemap entries which are referencing the data segment. When the reference count is zero, a cleaner application can delete the entry from the suitcase. It should be noted that the metadata is grouped together before the data segments. By grouping the metadata together, a single sequential read can bring in all of the metadata. Once all of the metadata is memory resident, parallel reads and decompression of multiple data segments can be scheduled. Reading and decompressing the data segments in parallel can significantly increase read performance on multi-core and clustered machines. The Datastore suitcase header includes the length and offset of the metadata. The header also includes the location of the next available offset for additional metadata entries.

With the dictionary, filemap suitcases and datastore suitcases, a file system independent layout for storing and referencing de-duplicated data can be implemented.

According to various embodiments, a de-duplication mechanism must be able to guarantee that data segments that are not identical will hash to a different value. If this is not the case, data loss may occur. To do this it is necessary to use a strong hash value which has a statistically negligible probability of collision. However, such hash values are computationally expensive and require more bytes to represent them. For example, a weak hash may require only 8 bytes whereas a strong hash may require 32 bytes. In particular embodiments, a dictionary includes a pair of elements, the hash value and the location of the associated suitcase the data segment can be found in. The suitcase location is encoded in 12 bytes. Thus, if 8 bytes are used for the hash versus 32 bytes, each dictionary entry will be 55% smaller. Since a dictionary can become large in size, 1 TB for example, saving 55% is very desirable.

According to various embodiments, the need for having uniqueness from a strong hash function is balanced with the space savings of a weak hash function. In particular embodiments, the weak hash value is stored in the dictionary and the strong hash value is stored as part of the metadata for the data segment in the datastore suitcase. When a data segment is identified, the weak hash value for the segment is checked against the dictionary. If there is a match, the strong hash value is compared against the value stored in the metadata for the data segment, if the strong hash is also a match, the data is identical. If either the weak hash or the strong hash does not match, the data is not identical.

If the weak hash is a match and the strong hash does not match, the location of the new data segment will be stored in the dictionary. The location of the previous data segment will not be locatable from the dictionary unless it is seen again. In particular embodiments, a list of locations are maintained to allow different data segments having the same weak hash to all be locatable.

Figure 1:
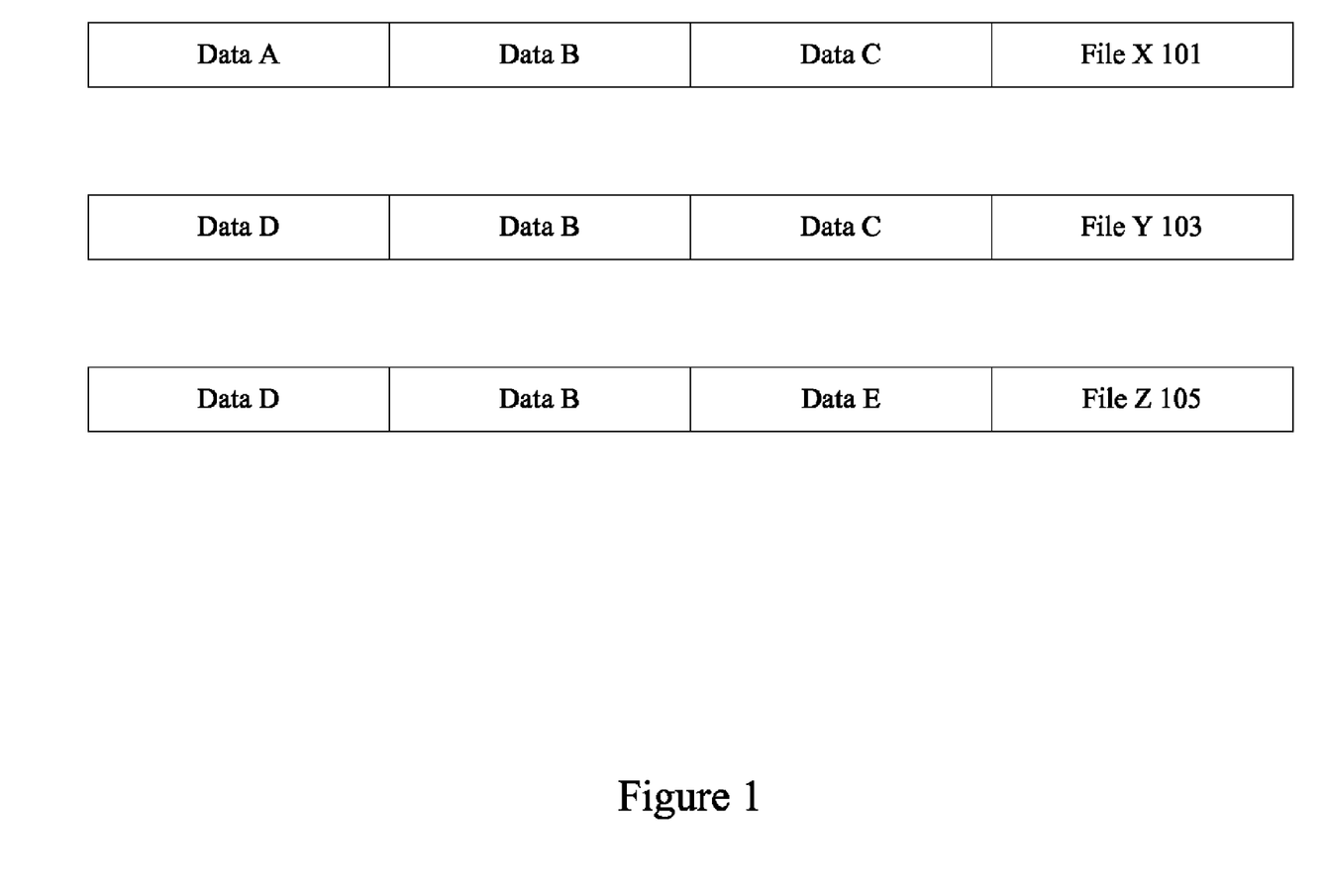
FIG. 1 illustrates a particular example of files and data segments.

FIG. 1 illustrates examples of files and data segments. According to various embodiments, file X 101 includes data A, data B, and data C. File Y 103 includes data D, data B, and data C. File Z 105 includes data D, data B, and data E. According to various embodiments, each data segment is 8K in size. The three files include five different segments A, B, C, D, and E. Files X 101, Y 103, and Z 105 can be deduplicated to remove redundancy in storing the different segments. For example, data B need only be stored once instead of three times. Data C and data D need only be stored once instead of twice. The techniques and mechanisms of the present invention recognize that common segments are determined during deduplication. Commonality characteristics and information can be maintained to allow efficient determination of segment commonality after deduplication.

Figure 2A:
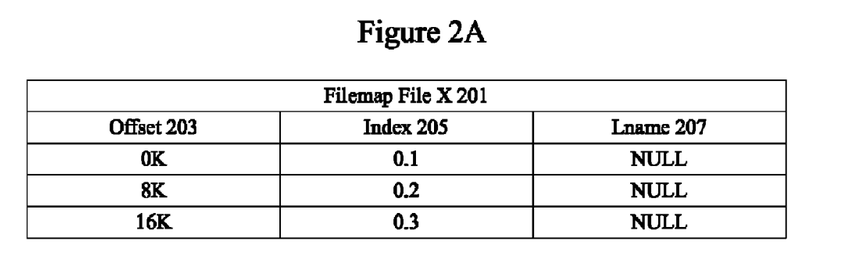
FIG. 2A illustrates a particular example of a filemap.
Figure 2B:
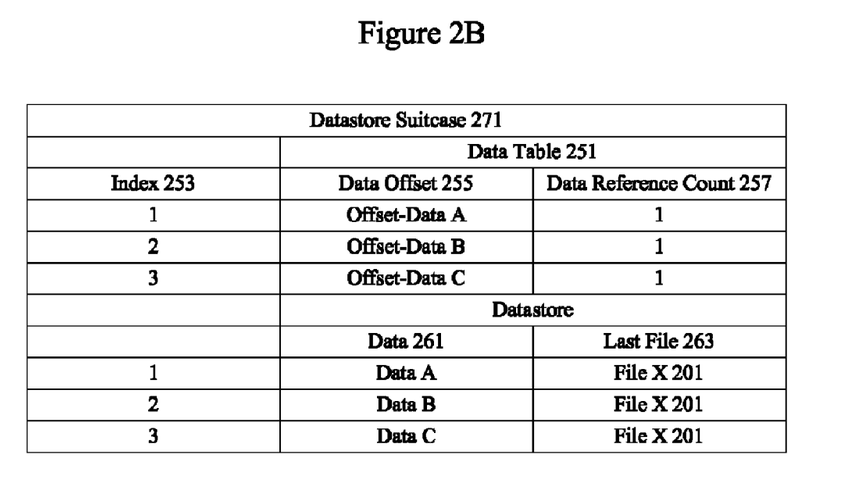
FIG. 2B illustrates a particular example of a datastore suitcase.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>.<Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section. According to various embodiments, datastore suitcase 271 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data b and a reference to File X 201 which was last to place a reference on the data B. Index 3 includes data C and a reference to File X 201 which was last to place a reference on the data C.

Figure 3A:
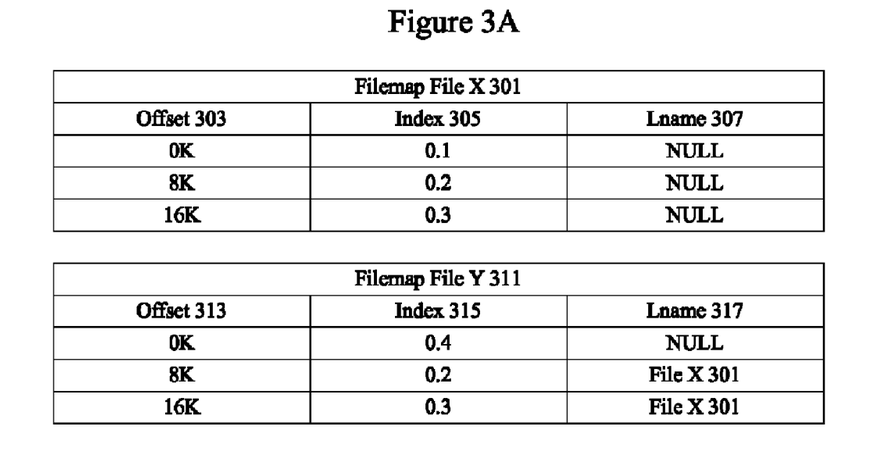
FIG. 3A illustrates a particular example of a filemap.

FIG. 3A illustrates file maps for two different files. Filemap file X 301 includes offset 303, index 305, and lname 307 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 311 includes offset 313, index 315, and lname 317 fields. According to various embodiments, each segment in the filemap for file X is 8K in size. The segments corresponding to offsets 0K, 8K, and 16K all reside in suitcase ID 0 while the data table indices include 4, 2, and 3. The lname field 317 is NULL in the filemap for offset 0K corresponding to index 0.4 because the segment has not previously been referenced by any file. However, the lname field 317 for offsets 8K and 16K corresponding to indices 0.2 and 0.3 have been referenced before by file X 301.

Figure 3B:
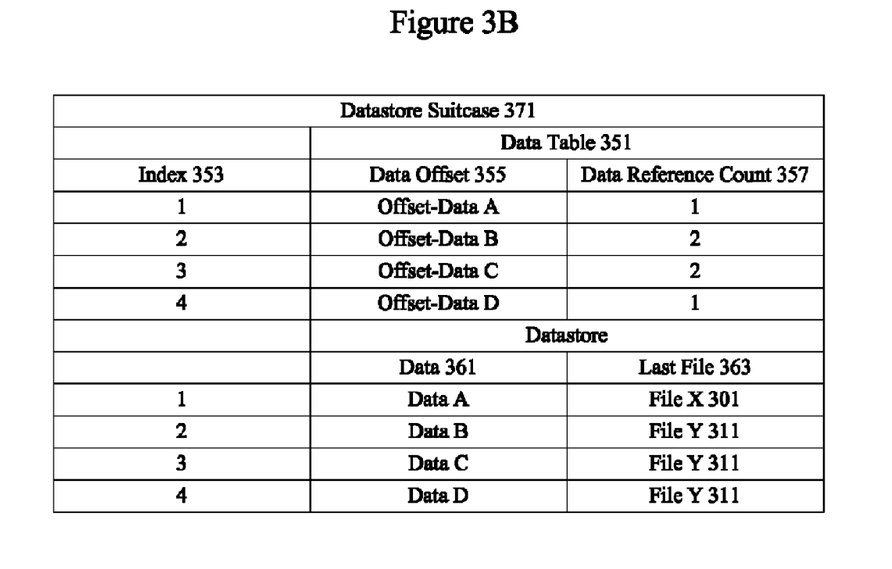
FIG. 3B illustrates a particular example of a datastore suitcase.

FIG. 3B illustrates one example of a datastore suitcase for file X 301 and file Y 311. According to various embodiments, datastore suitcase 371 includes an index portion and a data portion. The index section includes indices 353, data offsets 355, and data reference counts 357. The data section includes indices 353, data 361, and last file references 363. According to various embodiments, arranging a data table 351 in this manner allows a system to perform a bulk read of the index portion to obtain offset data to allow parallel reads of large amounts of data in the data section.

Index 0.1 corresponding to Data A is referenced by only file X 301. The reference count remains set at 1 and the last file 363 remains file X 301. Index 0.2 corresponding to Data B is referenced by file Y 311. The reference count is incremented to two and the last file field 363 is set to file Y 321. Index 0.3 corresponding to Data C is reference only by file X 301. The reference count remains set at 1 and the last file 363 remains file X 301. Index 0.4 corresponding to Data D is reference by file Y 311. The reference count is incremented and the last file 363 field is set to file Y 311.

According to various embodiments, since only the 1st data segment in file Y 311 is different from file X 301, only one additional entry for segment Data D is added to the Data Table 351. The reference counts for Data B and Data C are incremented since these data segments are common to file X 301 and file Y 311. Additionally, the lnames in the datastore suitcase for the last reference of Data C and Data B are changed to file Y 311. The last file reference for Data A remains file X 301 because Data A is not in file Y 311. Prior to overwriting the lnames in the Datastore, they are captured in the filemap of file Y 311.

Figure 4A:
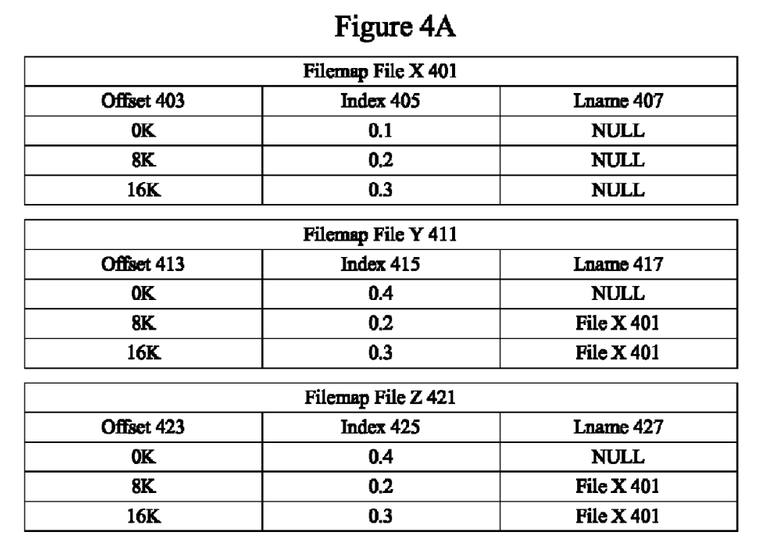
FIG. 4A illustrates another example of a filemap.

FIG. 4A illustrates file maps for three different files. Filemap file X 401 includes offset 403, index 405, and lname 407 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 411 includes offset 413, index 415, and lname 417 fields. According to various embodiments, each segment in the filemap for file X is 8K in size. The segments corresponding to offsets 0K, 8K, and 16K all reside in suitcase ID 0 while the data table indices include 4, 2, and 3. The lname field 417 is NULL in the filemap for offset 0K corresponding to index 0.4 because the segment has not previously been referenced by any file. However, the lname field 417 for offsets 8K and 16K corresponding to indices 0.2 and 0.3 have been referenced before by file X 401.

Filemap file Z 421 includes offset 423, index 425, and lname 427 fields. According to various embodiments, each segment in the filemap for file X is 8K in size. The segments corresponding to offsets 0K, 8K, and 16K all reside in suitcase ID 0 while the data table indices include 4, 2, and 5. The lname field 427 is NULL in the filemap for offset 16K corresponding to index 0.5 because the segment has not previously been referenced by any file. However, the lname field 427 for offsets 0K and 8K corresponding to indices 0.4 and 0.2 have been referenced before by file X 411.

Figure 4B:
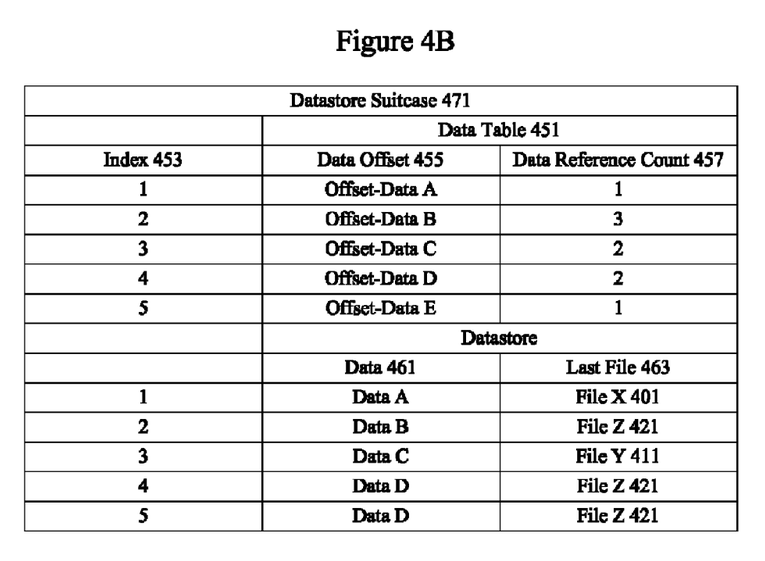
FIG. 4B illustrates another example of a datastore suitcase.

FIG. 4B illustrates one example of a datastore suitcase for file X 401, file Y 411, and file Z 421. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

Index 0.1 corresponding to Data A is referenced only by file X 401. The reference count remains set at 1 and the last file 463 remains set to file X 401. Index 0.2 corresponding to Data B is referenced by all three files 401, 411, and 421 and consequently has a reference count incremented to three and a last file 463 field set to file Z 421. Index 0.3 corresponding to Data C is reference by two files, file X 401 and file Y 411. The reference count remains set at two and the last file 463 field remains set to file Y 411. Index 0.4 corresponding to Data D is reference by two files, file Y 411 and file Z 421. The reference count is incremented to two and the last file 463 field is set to file Z 421. Index 0.5 corresponding to Data E is referenced only by file Z 421. The reference count is set to one and the last file 463 field is set to file Z 421.

According to various embodiments, since only the 1st data segment in file Z 411 is different from the segments in file X 401 and file Y 411, only one additional entry for segment Data E is added to the Data Table 451. The reference counts for Data B and Data D are incremented since these data segments are common to file X 401 and file Y 411. Additionally, the lnames in the datastore suitcase for the last reference of Data B and Data D are changed to file Z 421. The last file reference for Data A remains file X 401 because Data A is not in file Z 421. The last file reference for Data C remains file Y 411 because Data C is not in file Z 421. Prior to overwriting the lnames in the datastore 471, they are captured in the filemap of file Z 421.

Figure 5:
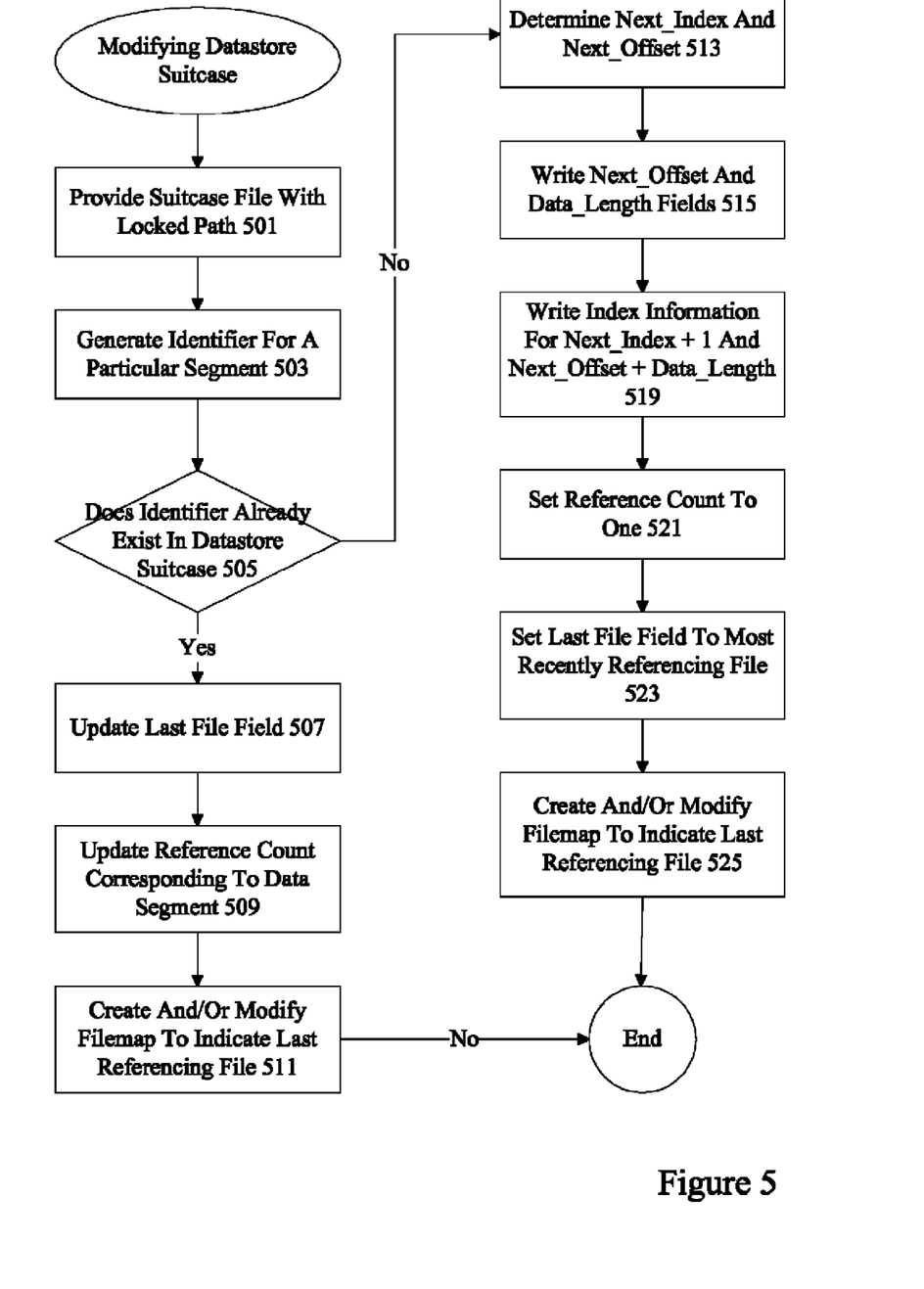
FIG. 5 illustrates a technique for modifying a datastore suitcase.

FIG. 5 illustrates a technique for modifying a datastore suitcase. At 501, a datastore suitcase with a locked path is provided for a particular file having one or more data segments. According to various embodiments, the suitcase file path is locked and the suitcase file itself is opened. If the suitcase file does not exist, a file such as sc.ofs is created. In particular examples, only one active suitcase file is permitted per directory, per system, and/or per user. At 503, an identifier for a particular segment is generated and evaluated to determine if the identifier already exists in the datastore suitcase at 505. In particular embodiments, the identifier is a hash or a portion of the data segment itself. If the identifier already exists in the datastore suitcase, the last file field is updated to indicate the most recent file having the segment at 507. The reference count corresponding to the data segment is incremented at 509. A filemap for the file is created and/or modified to indicate what file has last referenced the segment at 511.

If the identifier does not already exist in the datastore suitcase, the next_index and next_offset are determined from the suitcase file at 513. At 515, the next_offset and data_length fields are written into the data_length and data_info fields for the file at the next_index 505 value. At 519, index information is written for next_index+1 and next_offset+data_length. A reference count is set to 1 at 521 and a last file field is set to the most recently referencing file at 523. A filemap for the file is created and/or modified to indicate what file has last referenced the segment at 525.

Figure 6:
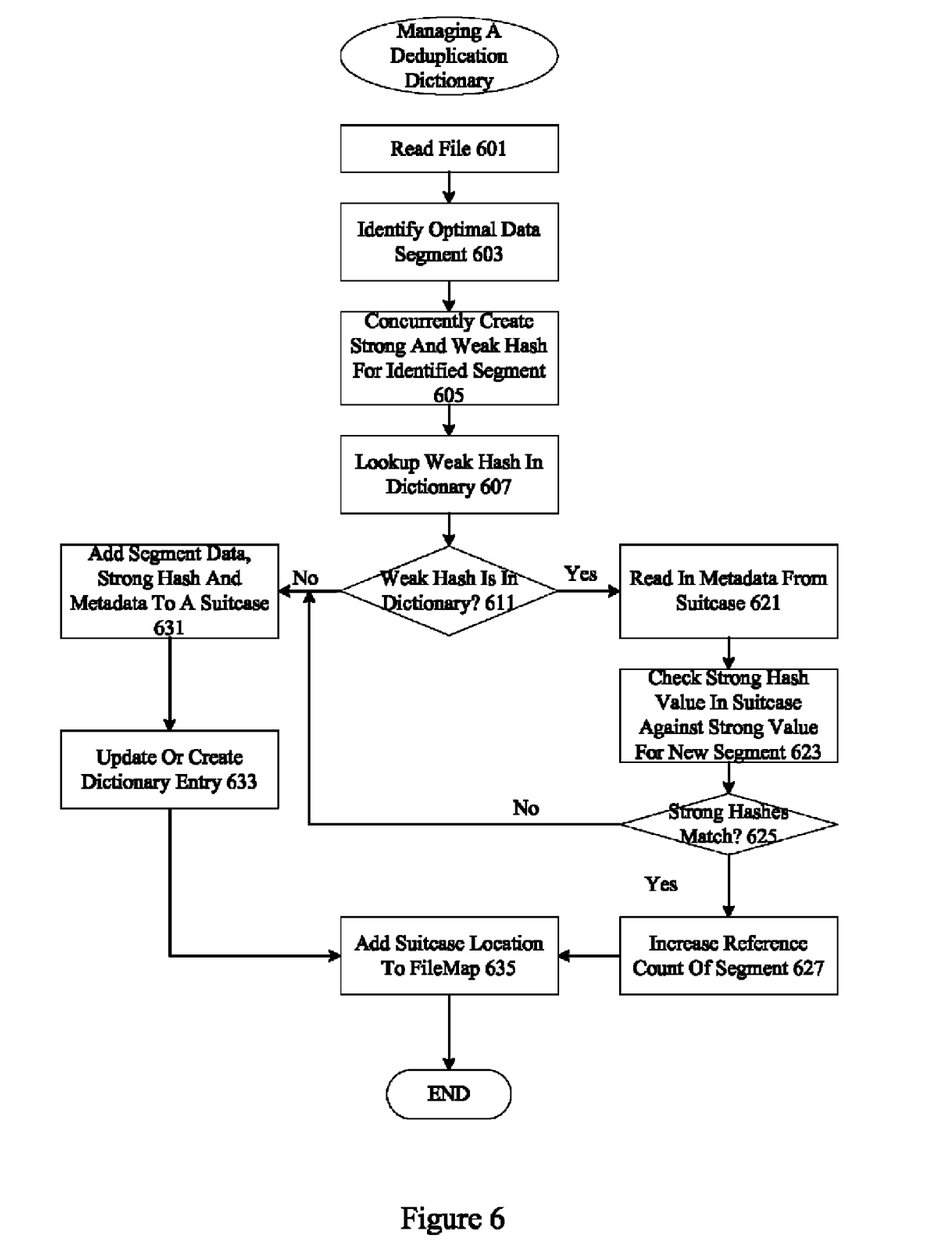
FIG. 6 illustrates a technique for managing a dictionary.

FIG. 6 illustrates a technique for managing a dictionary. According to various embodiments, a file is read at 601. An optimal data segment is identified at 603. In particular embodiments, strong and weak hash values are created for the identified segment at 605. A single read can be performed to generate the weak hash and the strong hash. In some embodiments, the weak hash it 16 bytes while the strong hash is 64 bytes. In other embodiments, the weak hash is 8 bytes whiles the strong hash is 32 bytes. At 607, the system checks to determine if the weak hash value is already resident in the dictionary. If there is a match at 611, metadata is read from the suitcase located using the dictionary at 621. The strong hash value in the suitcase is checked against the strong hash value for the data segment at 623. It should be noted that by checking a segment against multiple hashes makes it highly unlikely that a different data segment will accidentally be referenced. The likelihood that two different data segments have the same weak hash and the same strong hash is exceedingly unlikely. If the strong hashes match at 625, the reference count of the segment is increased at 627 and a suitcase location is added to the filemap at 635.

If either the weak hash does not match at 611 or the strong hash does not match at 625, segment data, a strong hash, and metadata is added to a suitcase at 631. A dictionary entry is updated or created at 633. If the weak hash does not match, a dictionary entry is created. If the weak hash matches but the strong hash does not match, the dictionary entry is updated. The location of the new data segment will be stored in the dictionary. The location of the previous data segment will not be locatable from the dictionary unless it is seen again. In particular embodiments, a list of locations are maintained to allow different data segments having the same weak hash to all be locatable.

Figure 7:
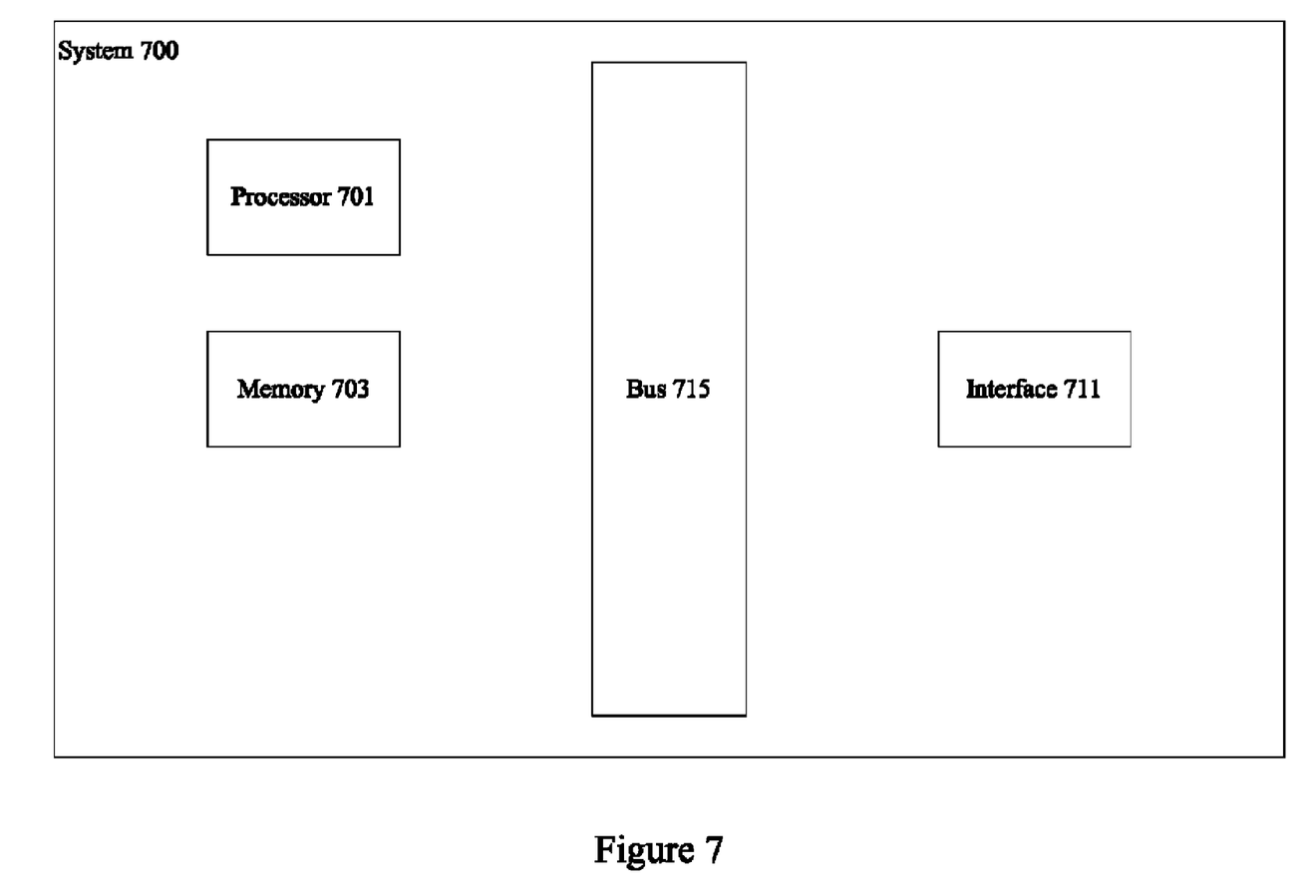
FIG. 7 illustrates a particular example of a computer system.

A variety of devices and applications can implement particular examples of commonality determination. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:
1. A method, comprising:
identifying a segment in a file for deduplication;
generating a strong a strong hash value and a weak hash value for the segment;
comparing the weak hash value to a plurality of weak hash values maintained in a deduplication dictionary;

reading metadata from a segment entry corresponding to the weak hash value;

comparing the strong hash value to a stored strong hash value maintained in the segment entry.

2. The method of claim 1, wherein if the strong hash value generated matches the strong hash value maintained in the segment entry, the reference count of the segment is incremented.

3. The method of claim 2, wherein if there are matches for the weak hash value and the strong hash value, a location of the segment entry is returned.

4. The method of claim 3, wherein the location of the segment entry is a suitcase location.

5. The method of claim 3, wherein a weak hash function is maintained using fewer bits than a strong hash function.

6. The method of claim 1, wherein if the strong hash value generated does not match the strong hash value maintained in the segment entry, the segment and the strong hash value generated is added to a suitcase.

7. The method of claim 6, wherein metadata for the segment is also added to the suitcase.

8. The method of claim 7, wherein the strong hash value generated is included in the metadata for the segment.

9. The method of claim 7, wherein metadata includes a last access time.

10. The method of claim 7, wherein metadata includes ownership and group association information.

11. A system, comprising:
an interface configured to receive a segment in a file for deduplication;
a processor configured to generate a strong a strong hash value and a weak hash value for the segment and compare the weak hash value to a plurality of weak hash values maintained in a deduplication dictionary;
wherein metadata from a segment entry corresponding to the weak hash value is read and the strong hash value is compared to a stored strong hash value maintained in the segment entry.

12. The system of claim 11, wherein if the strong hash value generated matches the strong hash value maintained in the segment entry, the reference count of the segment is incremented.

13. The system of claim 12, wherein if there are matches for the weak hash value and the strong hash value, a location of the segment entry is returned.

14. The system of claim 13, wherein the location of the segment entry is a suitcase location.

15. The system of claim 13, wherein a weak hash function is maintained using fewer bits than a strong hash function.

16. The system of claim 11, wherein if the strong hash value generated does not match the strong hash value maintained in the segment entry, the segment and the strong hash value generated is added to a suitcase.

17. The system of claim 16, wherein metadata for the segment is also added to the suitcase.

18. The system of claim 17, wherein the strong hash value generated is included in the metadata for the segment.

19. The system of claim 17, wherein metadata includes a last access time.

20. A computer readable storage medium having computer code embodied therein, the computer readable storage medium, comprising:
computer code for identifying a segment in a file for deduplication;
computer code for generating a strong a strong hash value and a weak hash value for the segment;
computer code for comparing the weak hash value to a plurality of weak hash values maintained in a deduplication dictionary;
computer code for reading metadata from a segment entry corresponding to the weak hash value;
computer code for comparing the strong hash value to a stored strong hash value maintained in the segment entry.

* * * * *

UNITED STATES PATENT AND TRADEMARK OFFICE
CERTIFICATE OF CORRECTION

PATENT NO. : 8,200,641 B2
APPLICATION NO. : 12/858230
DATED : June 12, 2012
INVENTOR(S) : Vinod Jayaraman Page 1 of 1

It is certified that error appears in the above-identified patent and that said Letters Patent is hereby corrected as shown below:

In column 8, line 64, in Claim 1, delete "a strong".

In column 9, line 31, in Claim 11, delete "a strong".

In column 10, line 27, in Claim 20, delete "a strong".

Signed and Sealed this
Twenty-eighth Day of August, 2012

David J. Kappos
*Director of the United States Patent and Trademark Office*